Jan. 22, 1963   G. D. OLSON   3,074,312
EXPOSURE METER
Filed April 28, 1958   2 Sheets-Sheet 1

INVENTOR
GORDON D. OLSON

BY *Harness, Dickey & Pierce*
ATTORNEYS

INVENTOR
GORDON D. OLSON

United States Patent Office 3,074,312
Patented Jan. 22, 1963

3,074,312
EXPOSURE METER
Gordon D. Olson, 31070 Grandon, Livonia, Mich.
Filed Apr. 28, 1958, Ser. No. 731,296
3 Claims. (Cl. 88—24)

The present invention relates to improved photographic equipment for measuring light values, and more particularly but not necessarily exclusively to an improved densitometer especially adapted for use in connection with making photographic enlargements, and including means for separately determining any one of the following four parameters as a function of the other three: the intensity of the illumination, the sensitivity of the photographic paper, the finished print density, and the exposure duration required to produce a print having the desired density.

In making photographic enlargements, the darkroom technician is confronted with the problem of balancing and properly correlating several variables, including, for example, the sensitivity, or photographic speed rating of the paper upon which the enlargement is to be printed, the intensity of the field illumination as controlled by the energization of the projector lamp or by variation of the effective lens aperture of the projector, the density desired in the finished print, and the exposure time. In the apparatus of the present invention, provision is made for automatically determining the proper value of any one of these parameters when the other three are given either by selection through the operator's choice or by the nature of the image to be printed. The apparatus also permits ready and simple comparison of density values in different relatively small area portions of a projected light image, and the determination of the different exposure times required for printing different areas of a single image to achieve a desired density range. The various controls of the apparatus are correlated with each other so that they may be independently calibrated according to the characteristics of the photographic materials available to the operator, and so that a variation in any one of the controls does not affect the calibration of any other one.

In enlarging a photographic negative, the negative is placed in an enlarging apparatus which passes light through the negative and projects a resultant image onto a piece of photographic paper. This image is projected for the required amount of time to cause a correct exposure of the paper for permanently recording the enlarged image. In order to obtain a satisfactory enlargement having the proper finished print density, there must be a proper balance between the intensity of light projected onto the enlarging paper, the speed of the enlarging paper, and the duration of the projection. In order to assist the operator in arriving at the correct exposure, numerous attempts have been made to devise an exposure meter suited for use with an enlarger. Although some of these devices have provided acceptable results, they have not been entirely satisfactory. These meters may measure the amount of light transmitted through the negative or some portion thereof. However, the operator must then choose the proper paper and compute the correct period for the exposure thereof. He then actuates the enlarger for the desired period. The necessary computations that are to be made by the operator are time consuming and the accuracy thereof is dependent upon operator skill. As a result, heretofore, enlarging has been a time consuming process requiring considerable skill with its resultant waste.

It is now proposed to provide means for sensing the amount of light projected by an enlarger and to automatically determine the proper balance between the amount of light, paper speed, density and exposure and to automatically actuate the enlarger for the required period to produce the correct exposure. More particularly, a control mechanism is provided in which the operator may set any three of the foregoing factors. The control mechanism will then automatically determine the fourth factor. The mechanism also includes a timer that will automatically actuate the enlarger for the required time to insure a proper exposure. This is accomplished by providing a photosensitive element for sensing the amount of light projected onto a small area and an analogue computer that is responsive to a signal from the photosensitive element. The photosensitive element has an output current that is a function not only of the amount of light striking the element but also the voltage applied thereto. The computer includes means for varying this voltage in accordance with the finished print density, paper speed and any other information such as the temperature and characteristics of the developer. The current output of the photosensitive element flows through a resistor that is varied to produce a constant voltage drop thereacross. This resistance will then be a function of the desired exposure. Consequently, it may be placed across a capacitance having a predetermined charge thereon so as to actuate a time relay that allows the enlarger to remain on for the correct period of time.

Figure 1:
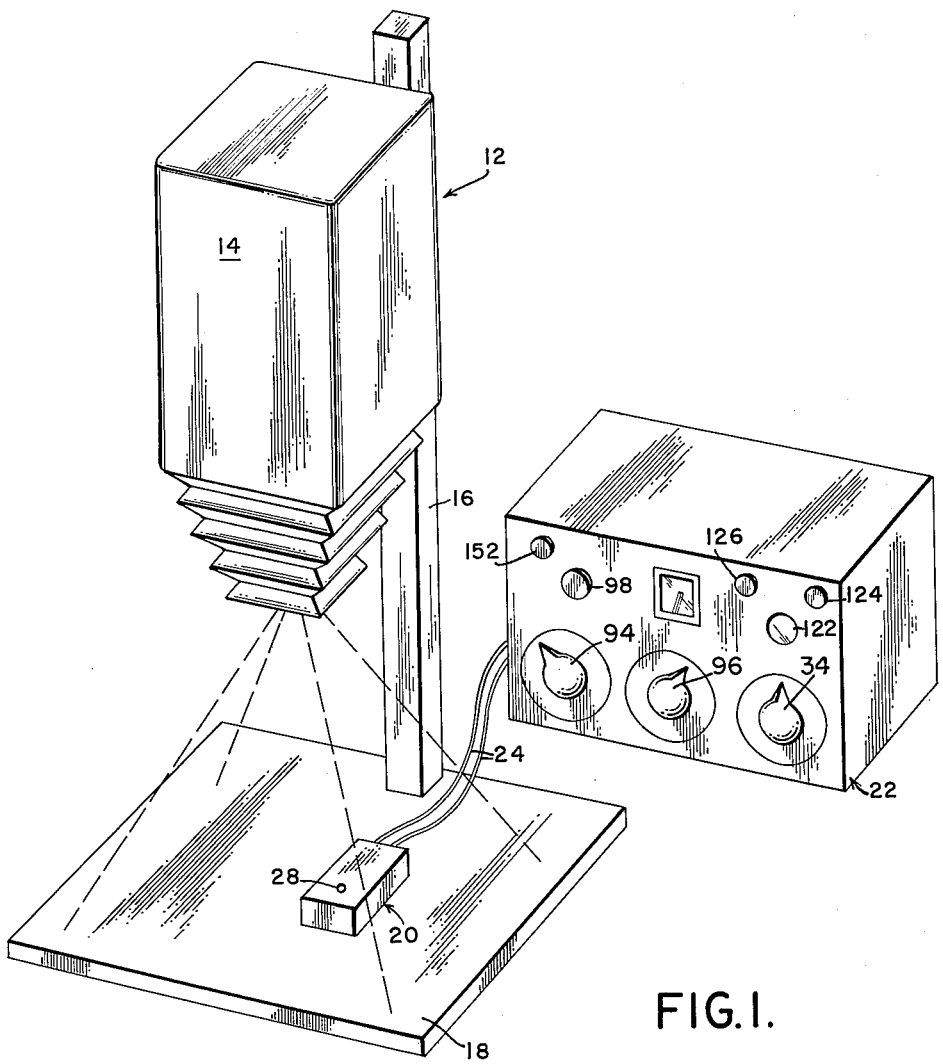
FIGURE 1 is a perspective view of an enlarger and a control mechanism therefor that embodies the present invention.
Figure 2:
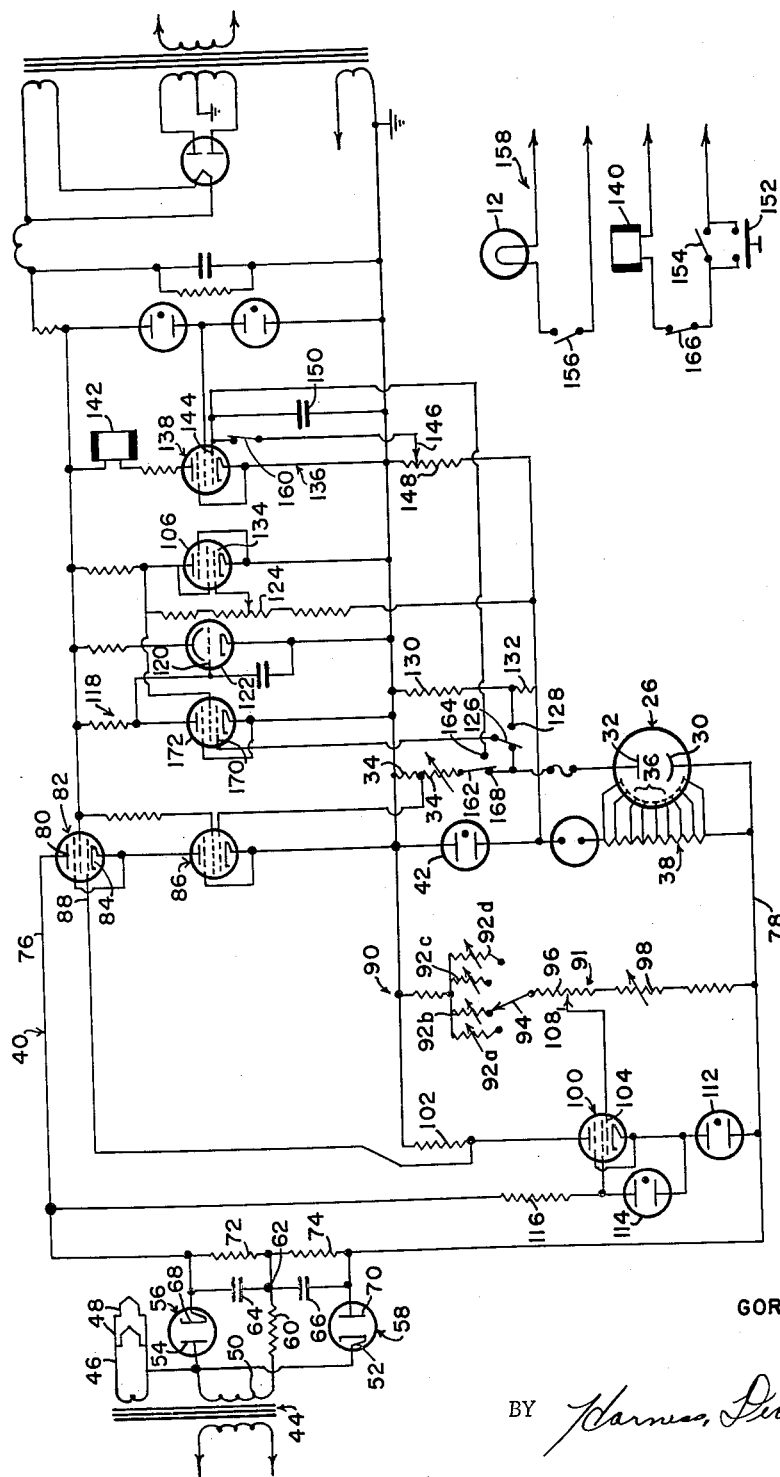
FIGURE 2 is a wiring diagram of the control mechanism.

Referring to the drawings in more detail the present invention is adapted to be employed in a control mechanism for regulating a photographic enlarger 12. This enlarger 12 includes a projector 14 that is slidably mounted on a pedestal 16 extending upwardly from an easel 18. The projector 14 includes means for receiving a photographic negative and a lens to project an image of this negative onto the easel 18 for exposing a suitable piece of photographic paper.

The control mechanism includes a probe 20 and a control unit 22 which is interconnected with the probe 20 by a suitable cable 24. The probe 20 consists of a compact light-tight box having a photosensitive element such as a photomultiplier tube 26 mounted therein. A restricted aperture 28 is provided in the top of the box in direct alignment with the photomultiplier tube 26 to permit the light to pass therethrough and strike the tube. It is highly desirable for the area of the aperture 28 to be sufficiently small to permit the measurement of light to be confined to a limited portion of the image such as a highlight area. Thus, if the probe 20 is disposed on the easel 18 and the enlarger 12 is projecting an image, a small portion of the light will penetrate the aperture 28 and the photomultiplier tube 26 will develop a signal indicative of the intensity of light falling thereon.

The photomultiplier tube 26 is of conventional design so that the signal therefrom will be a current that is a function of the amount of light and the voltage thereacross. The tube 26 includes a cathode 30, an anode 32 that is connected directly to a variable resistance load 34 and a plurality of dynodes 36 that are connected to a voltage dividing network 38 that extends across the load 34 to the cathode 30. The resistance load 34 is connected to a variable high voltage supply 40 that supplies the desired voltage to the anode 32 and dynodes 36. It has been found that tubes of this nature operate most satisfactorily with a constant potential between the last dynode and the anode. Accordingly, if desired, a constant voltage gas filled tube 42 may be provided to insure such a voltage difference.

The variable voltage source includes a power transformer 44 having a step-down secondary winding 46 for tube filaments 48 and a step-up secondary 50 for providing a high voltage. One side of the step-up secondary 50 is connected to the cathode 52 and plate 54 of a pair of rectifier tubes 56 and 58, while the opposite side thereof is connected to one end of a resistor 60. The opposite end of the resistor 60 is interconnected with the center 62 of a pair of filtering condensers 64 and 66 extending between the other cathode 68 and plate 70 of the rectifier tubes 56 and 58. The charge on these condensers 64 and 66 will be cumulative to thereby form a voltage doubler circuit having an output voltage approximately double the voltage induced in the step-up secondary winding 50. A pair of bleed-down resistors 72 and 74 may be connected across the condensers 64 and 66 to improve their filtering action and to dissipate the charge on the condensers when the control mechanism is not in use. A high voltage wire 76 and a low voltage wire 78 are connected to the opposite ends of these resistors 72 and 74 to carry the voltage to various portions of the circuit.

The low voltage conductor 78 is connected directly to the cathode 30 of the photomultiplier tube 26 and also to the lower end of the network 38 of dropping resistors supplying the potential to the various dynodes 36. The high voltage conductor 76 is connected to the plate 80 of a voltage regulating tube 82. The cathode 84 of this tube 82 is connected to the resistance 34 in the plate circuit of the photomultiplier tube 26 through the medium of a cut-off tube 86 that is normally conducting. This cut-off tube 86 is a safety element to protect the photomultiplier tube 26 against overload. This tube 86 is normally conductive with a minimum voltage drop thereacross. In the event of excessive plate currents in the photomultiplier tube, this current will cause a voltage drop across the resistor 34' that will bias the tube toward cut-off and thereby reduce the voltage across the multiplier tube.

It may thus be seen that the voltage across the photomultiplier tube 26 and its load 34 will be equal to the voltage from the doubler circuit minus the voltage drop across the voltage regulating tube 82. The voltage drop across this tube 82 will be determined by the potential or bias on the control grid 88 of the tube 82.

In order to provide a variable voltage supply 40 for the multiplier tube 26 and its load 34, a self-stabilizing variable voltage system 90 is provided for regulating the bias on the control grid 88. This system 90 includes a network 91 of voltage dividing resistors that are connected across the photomultiplier tube 26 and its load 34 so that they will be subject to the same variable voltage that is applied to the photo tube and its load. The network 91 of voltage dividing resistors include a plurality of sensitivity resistors 92a, 92b, 92c and 92d which may be individually placed in the network by a multiposition switch 94, a density potentiometer 96 and a variable compensating resistor 98. In addition, this system 90 includes a variable current tube 100 having a resistive load 102 and a cathode circuit, all of which are in series with each other and in parallel to the network 91 of dividing resistors. The screen is maintained at a set amount by means of the gas filled tube 114 and dropping resistor 116. The control grid 104 of the current tube 100 is connected directly to the adjustable center tap 108 of the density potentiometer 96. The cathode circuit of the variable current tube 100 includes a gas filled tube 112 that is connected to the low voltage wire 78 to thereby insure a constant voltage on the cathode.

It will thus be seen that the voltage across tube 26 and its load 34 will be determined by the drop across tube 82. This drop is controlled by the grid bias of tube 82 which is determined by the voltage drop across resistor 102. This voltage drop in turn is a function of the plate current for tube 100 which is controlled primarily by the grid bias of tube 100. This system provides high amplification of the control signal on the grid of tube 100; thus extremely small changes in voltage on the grid of tube 100 can be made to control the voltage across tube 26 and its load 34 over the entire operating range. This also means that the voltage between the low voltage wire 78 and the center tap 108 will be substantially constant throughout the operating range, being equal to the voltage across the voltage regulating tube 112 less the substantially constant grid bias of tube 100. This fact is significant in the voltage control function.

From inspection of this circuit it may be seen that the relationship between this virtually constant voltage $E_k$, the variable voltage $E_v$ across tube 26 and its load 34, the resistance $R_x$ between the center tap 108 and ground wire 78, and the total resistance $R_t$ of the resistance network 91, is as follows:

(1) $$\frac{E_k}{E_v}=\frac{R_x}{R_t}$$

or (2) $$E_v=\frac{R_t}{R_x}\times E_k$$

Since $E_k$ is virtually constant, it can be seen that the variable voltage $E_v$ may be controlled either by varying the center tap 108 which would control $R_x$ above, or by selecting difference resistance values with switches 94 or 98 which would control $R_t$ above. If for example control 96 were moved to increase the resistance between center tap 108 and ground, the voltage of grid 104 would tend to increase. This would create an amplified voltage drop across load 102, increasing the bias on grid 88. This would produce a greatly amplified voltage drop across tube 82 reducing the variable voltage across the tube 26 and its load 34. This variable voltage would be reduced until the voltage fed back to grid 104 through center tap 108 was returned to its original value maintaining the relationship shown by Equations 1 and 2.

It will also be seen that the selection of different resistance values by means of switch 94 or variable resistance 98 will have similiar effects on the variable voltage across tube 26 and its load 34.

It will be seen that this not only provides a very easily controlled voltage for the photomultiplier tube 26 but also a very stable one due to the feedback of any voltage variations to the grid 88 of the regulating tube 82. In the event the voltage across the dividing network 91 and photomultiplier tube 26 tends to rise, the bias on the grid of the tube 100 will tend to rise. This will result in a tendency of the plate current to increase through the variable current tube 100 and cause a corresponding increase in the voltage drop across the load resistor 102. As a consequence, the bias on the grid 88 of the regulator tube 82 will become more negative and increase the voltage drop thereacross, thereby restoring the regulated voltage to the amount prior to the fluctuation. Conversely, if the voltage tends to drop the reverse effect will occur and the voltage will be maintained at its set amount.

The characteristics of the photomultiplier tube circuit are substantially linear throughout a relatively wide range of operating voltages so that when any given voltage is applied to the tube 26 its output current will vary in proportion to the intensity of the light falling upon the photo cathode 30. The plate current of the photomultiplier tube 26 constitutes a first electrical signal which is responsive to the illumination in the selected area portion of the projected light image. The signal is also responsive to the voltage applied to the photomultiplier tube 26, which may be varied by adjusting the density control potentiometer 96 as hereinabove described to adjust the signal in accordance with the density it is desired to achieve in the selected area portion of the finished print. The switch 94 and the potentiometers 92a–92d also affect the voltage applied to the photomultiplier tube 26 to adjust the value of the first electrical signal in accordance with the photographic speed rating of the photographic paper to be employed. The potentiometers 92a–92d are preferably calibrated accordingly. The other potentiometer 98 in the voltage adjusting network 90 is provided to compensate for other variables, such as, for example, developer solution strength, without affecting the calibrations of the density control potentiometer 96 and the sensitivity adjusting potentiometers 92a–92d.

It is also apparent that the resistance 98 may be arranged to compensate for such variables as the developer strength, etc. Thus, positioning the switch 94 will place a resistor in the circuit that will be effective to cause the voltage applied to the photomultiplier tube 26 to produce a sensitivity thereof corresponding to the sensitivity of the enlarging paper. The position of the variable center tap 108 varies the applied voltage on the photomultiplier tube 26 and may be set to correspond to the finished print density required.

When the operator desires to employ a particular paper and to obtain a particular density, he merely sets the paper selector 94 and density control 96 to correspond thereto. The light striking the photomultiplier tube 26 will then produce an output current in the plate circuit 34 indicative of the duration of the exposure required to produce the desired density on that particular paper.

The output current signal produced by the photomultiplier tube 26 is thus responsive to the intensity of illumination in the selected area portion of the projected light image and is adjustable by means of readily calibrated controls in accordance with the paper sensitivity, the desired print density, and other parameters such as the strength of the developer solutions. The output signal is applied to a variable circuit element which, in the illustrated embodiment, is the variable resistor 34 to produce a second electrical signal. The variable circuit element is then varied to adjust the second signal to a reference value, whereby the resulting value of the variable circuit element provides an indication of the exposure time required to produce a finished print on the selected paper having the desired density in the selected area portion, under the illumination conditions sensed by the photomultiplier tube.

For convenience of operation it is desirable for a given setting of the density control 108 to produce the same finished print density irrespective of the setting of the sensitivity or paper speed switch 94. In other words, the angular rotation $\theta$ of the density control 108 must be equal for a given density for all paper speeds that may be set on the sensitivity control. To accomplish this objective let $R_x$ represent the resistance between the center tap 108 and the lower end of the network 91. This resistance may be expressed as a percentage of the total resistance of the network. Accordingly, $$(1) \quad P = \frac{R_x}{R_1 + R_2 + R_3}$$

where $R_1$ is the resistance of the sensitivity resistor 92a to 92d selected by the switch 94, $R_2$ is the resistance of the potentiometer 96 and $R_3$ is the resistance of the compensating resistance 98 and $\theta$ is expressed as percentage of total rotation. Since $\theta$ is the angular adjustment of the density control by substituting for $R_x$ Equation 1 may be rewritten as $$(2) \quad P = \frac{R_3 + \theta R_2}{R_1 + R_2 + R_3}$$

Solving this Equation 2 for $\theta_a$ and $\theta_b$ which are the density setting of center tap 108 for papers "a" and "b" respectively.

$$(3) \quad \theta_a = \frac{P_a(R_{1a} + R_2 + R_3) - R_3}{R_2}$$

and $$(4) \quad \theta_b = \frac{P_b(R_{1b} + R_2 + R_3) - R_3}{R_2}$$

where $R_{1a}$ equals the resistance 92a as selected by switch 94 when set for paper "a" and where $R_{1b}$ equals the resistance 92b as selected by switch 94 when set for paper "b." In order for a common setting of the density control to produce the same density on paper "a" and paper "b" by definition $\theta_a$ and $\theta_b$ must be equal to each other. Accordingly, $$(5) \quad \theta_a = \frac{P_a(R_{1a} + R_2 + R_3) - R_3}{R_2} = \theta_b = \frac{P_b(R_{1b} + R_2 + R_3) - R_3}{R_2}$$

Equation 5 may then be reduced to the proportion $$(6) \quad \frac{P_a}{P_b} = \frac{R_{1b} + R_2 + R_3}{R_{1a} + R_2 + R_3}$$

By inspection it can be seen that the resistances $R_{1a}$ and $R_{1b}$ may be chosen so as to maintain the equality of this equation. Thus by properly selecting the values of $R_{1a}$ and $R_{1b}$, one setting $\theta$ of control 96 will provide a given density on either paper a or paper b. Since the ratio of $P_a$ to $P_b$ remains substantially constant throughout the range of densities of papers a and b, any setting of $\theta$ will provide nearly identical results on either paper. It should be noted that although this relation has been demonstrated for only a pair of different papers, the same relation can be maintained for any number of papers.

It will thus be seen that the current from the photomultiplier tube 26 will be a function of the amount of light, the density required and the paper speed and, accordingly, will be inversely proportional to the duration of the required exposure. In order to utilize this information the plate circuit of the photomultiplier tube 26 includes a variable resistance 34 through which the plate current flows. Since the current through the tube 26 is inversely proportional to the desired time, if the resistance is adjusted so that this current causes a predetermined voltage across the resistor 34, then the amount of resistance will also be proportional to the duration of the exposure. In order to facilitate the adjustment of this resistance to obtain a precise voltage thereacross, a D.C. amplifier 118 is provided to apply a potential to the grid 120 of a ray type indicator tube 122 such as a 6AF6G. Thus when the resistance 34 has a predetermined voltage thereacross, the pattern on this tube 122 will be just closed. The cut-off of the D.C. amplifier 118 is controlled by the setting of the potentiometer 124 in the grid circuit of the tube 106. By manually moving switch 126 to the contact 128 the resistors 130 and 132 will apply a known percentage of the constant voltage across the gas filled tube 42 to the control grid 134. Thus the potentiometer 124 may be accurately adjusted to insure the pattern on the tube 122 closing at a carefully controlled voltage.

The potentiometer 124 may be calibrated in terms of the sensitivity of a photographic paper to be used in making the enlargement, in which case the network, including the resistors 92a–92d and the switch 94 would be replaced with a single resistor of appropriate value. Changes in the setting of the potentiometer 124 would then change the grid voltage at which the pattern on the indicator tube 122 closes and thereby compensate for differences between the speed ratings of different photographic papers by adjusting the reference voltage instead of by adjusting the sensitivity of the photomultiplier tube 26.

The timer circuit 136 includes a tube 138, a first relay 140 and a second relay 142 in the plate circuit of the tube 138. The grid 144 of the tube 138 is normally biased beyond cut off by a constant voltage supplied by an adjustable center tap 146 on the potentiometer 148 across the gas filled tube 42. The first relay 140 is controlled by a cycle start button switch 152 and closes a holding switch 154 across the cycle start switch 152 and switch 156 in the enlarger power circuit 158, opens switch 160 and moves switch 162 to contact 164. When this happens the enlarger 12 will be turned on and, simultaneously therewith, the grid bias from the potentiometer 148 will be removed but it will be maintained by the condenser 150. However, the resistance 34 will be across the condenser 150 to form an RC circuit that will gradually reduce the grid bias until the tube 138 becomes conductive. Since the resistance 34 has previously been set to correspond to the duration of the exposure and since the resistance 34 is in the RC circuit and determines the rate of discharge of condenser 150, the period for the tube 138 to become conductive will equal the time of the exposure. When the tube 138 becomes conductive, it will energize the relay 142 and open switch 166 in the relay circuit. This will de-energize the relay 140 opening the switches 154 and 156, closing switch 160 and moving switch 162 to the contact 168. This will shut off the enlarger 12, place the resistor 34 in the plate circuit of the photomultiplier tube 26, and charge the condenser 150 so as to shut off the tube 138.

Prior to placing the apparatus in service and occasionally during the use thereof, it should be calibrated to insure a proper correlation between the various controls and other factors involved.

The timer 136 may be calibrated by placing the timer control on some known amount such as sixty seconds and comparing the period the enlarger 12 is on against a clock. By adjusting the position of the center tap 146 on the potentiometer 148, the voltage applied to the grid 144 and across the condenser 150 may be varied until the timer actuates the relays 140 and 142 so that the action of the timer 136 is made to coincide with the clock.

The voltage at which the pattern on the ray tube 122 just closes may be calibrated by moving the switch 126 to interconnect the grid 170 of tube 172 with the junction between the resistors 130 and 132. These resistors 130 and 132 are proportioned to divide the constant voltage across gas filled tube 42 so that resistor 130 will have a voltage thereacross which is equal to the voltage that is to be maintained across the load resistor 34. The potentiometer 124 may then be adjusted to cause the pattern on the tube 122 to close. Thus, whenever the resistor 34 is adjusted to just close the pattern on the tube 122, it will have a voltage thereacross which is exactly equal to the very accurate reference voltage across the resistors 130 and 132.

A step density negative may now be placed in the enlarger and the timer 136 set to some given amount. A piece of paper is then placed on the easel 18 and the timer 136 actuated to cause an exposure of the test paper. After developing the test paper the pattern thereon is visually compared with a reference density having some known amount such as 0.8 to determine the step of the pattern having a density most closely matching the reference density. The density control 108 is then set to correspond with the value of the known reference density and the probe 20 placed on the selected step corresponding to the known density. Then without in any way disturbing the density or timer control 108 or 34, the compensator resistance 98 is adjusted to just balance the pattern on the ray indicator tube. The apparatus is now properly calibrated to insure the desired results.

A common use of the control apparatus is to determine the correct exposure for the projected image and to automatically actuate the enlarger 12 for a period to insure the correct exposure. This is accomplished by placing the negative in the enlarger 12 and projecting the negative image onto the easel 18 in the desired size and with the desired aperture in the enlarger. The desired paper is then selected and the sensitivity control switch 94 set to utilize a resistance 92 corresponding to the speed of the selected paper. The image is then examined to determine the most important area thereof and the finish print density that is required for that area. The density control 108 is set to correspond to this density and the probe 20 placed on the easel with the aperture 28 in the chosen area. It should be noted that due to the small size of the aperture 28, even though the critical area is very small, for example, a highlight, etc., the light can be accurately measured. The time control 34 is now adjusted to vary the resistance of the load in the plate circuit of the photomultiplier tube 26 until the voltage thereacross is just adequate to close the pattern on the ray tube. Since the voltage applied to the tube 26 is a function of the finished print density, paper speed, etc. and the light striking the tube 26 from the enlarger, the current output of the tube 26 will be an inverse function of the duration of exposure. Consequently, adjusting the resistance 34 to have a predetermined voltage thereacross will make the resistance 34 a direct function of the duration of the exposure. Thus the setting of the time control 34 will now indicate the correct duration of the exposure in seconds. However, the amount of this setting may be ignored since the time has now been automatically adjusted to produce an exposure of this duration.

The enlarger 12 may now be shut off and the probe 20 replaced with the selected enlarging paper. The cycle start button 152 is depressed to energize the relay 140. This will simultaneously close the hold switch 154, close the enlarger power switch 156, move switch 162 to contact 164 and open switch 160. Releasing the start button 152 will not de-energize the relay 140 due to the self-holding action resulting from the closing of the switch 154. As long as the relay 140 remains energized, the enlarger 12 will be on, the potential removed from the condenser 150 and the resistor 34 placed thereacross. The condenser 150 which now supplies the grid bias for the tube 138 will discharge through the resistor 34. Since the value of this resistance has been previously set to correspond to the duration of the exposure, the period for the condenser 150 to discharge enough for the tube 138 to become conductive will be equal to the time of exposure. When the tube 138 becomes conductive, it will energize the relay 142 and open the switch 166. This will de-energize the relay 140 and simultaneously open switches 154, 156, close switch 160 and move switch 162 to contact 168. Thus, after properly exposing the paper, the enlarger 12 will be shut off, the resistance load 34 placed in the plate circuit of the multiplier tube 26 and the condenser 150 charged to place the control apparatus in condition for another similar operation.

If in analyzing the projected image it becomes apparent that different areas of the image require different exposures, the exposure for each area may be determined by placing the probe 20 in the different areas and determining the period of exposure from the time control 34 as described above. Then the exposures of the different areas may be varied by suitable dodging techniques.

If it is desirable to determine the finished print density without actually printing the negative, the negative may be placed in the enlarger 12 so as to project an image thereof onto the easel 18. The sensitivity switch 94 is then set to correspond to the paper which has been selected and the time control 34 is set to correspond to the period of the exposure under consideration. The probe 20 may then be placed in any areas of the image that are to be considered. By adjusting the density control 108 to just close the pattern on the ray tube 122, the setting of this control will indicate the density of the sampled portion of the finished print.

The relative densities of various areas may be determined by projecting the negative onto the easel. The larger the projected image is the more accurate and simpler the determination may be made. The timer control is set at one second and the probe 20 placed in the brightest portion of the image. The density control 108 is now adjusted to just balance out the pattern on the ray indicator tube 122. The probe 20 may now be moved to any other area of the negative and the time control 34 adjusted to just balance out the pattern on the ray indicator tube 122. The relative density of the two areas will now be indicated by the setting on the time control 34.

What is claimed is:
1. A photoelectric densitometer for examining a nega- tive image to control print density in selected areas of the image on paper of known characteristics, said densitometer comprising a photoelectric transducer having an output related to light intensity in a selected area of a light image, a manually operable density control electrically connected to said transducer for varying the sensitivity thereof, said density control having indicia representative of a range of print densities, a manually operable variable time control for converting the output from said transducer to an electrical potential, said time control having indicia representative of a range of exposure time, a manually operable paper speed control for establishing a reference potential, said paper speed control having indicia representative of a range of printing paper speeds, and electrical indicating means for comparing said time and reference potentials, said time control being adjustable to balance said time and reference potentials whereupon the indicia thereof is representative of an exposure time necessary for a print having a density in said selected area of the image as represented by the indicia of said density control, said print density control being adjustable upon examination of another area of the light image to balance said time and reference potentials so that the indicia on said density control represents the print density of said another area whereby the density range of a finished print can be controlled.

2. A photoelectric densitometer for examining a negative image to control the density range of a finished print on paper of known characteristics, said densitometer comprising a photoelectric transducer having an output related to the intensity of illumination in a selected area of a light image, a finished print density control electrically connected to said transducer for varying the output of said transducer, the setting of said density control being representative of print density in said selected area of the light image, a variable time control electrically connected to said transducer for converting the output of said transducer to a signal related to exposure time, the setting of said time control being representative of exposure time, a manually operable paper speed control for establishing a reference signal relating to paper speed, the setting of said paper speed control being representative of the speed of the printing paper, and electrical indicating means for comparing said time and reference signals, said time control being adjustable to vary the relationship between said time and reference signals so that its setting is representative of an exposure time necessary for a print having a density in said selected area of the image represented by the setting of said density control.

3. A photoelectric densitometer for examining a negative to control the density range of a finished print on paper of known speed, said densitometer comprising a photoelectric transducer having an output related to the intensity of illumination in a selected area of a light image, a finished print density control electrically connected to said transducer for varying the output of said transducer, the setting of said density control being representative of print density in said selected area of the light image, a variable time control electrically connected to said transducer for converting the output of said transducer to a signal related to exposure time, the setting of said time control being representative of exposure time, a variable paper speed control for establishing a reference signal relating to paper speed, the setting of said paper speed control being representative of the speed of the printing paper, electrical indicating means for comparing sad time and reference signals, said time control being adjustable to vary the relationship between said time and reference signals so that upon adjustment to a desired relationship its setting represents an exposure time necessary for a print having a density in said selected area of the image represented by the setting of said density control, said finished print density control being adjustable to vary the relationship between said time and reference signals to reflect the density of other areas of the light image upon examination thereof with said transducer whereby the density range of the finished print can be controlled, and timer means responsive to said timer control for varying exposure time in accordance with the setting thereof.

References Cited in the file of this patent
UNITED STATES PATENTS

| | | |
|---|---|---|
| 2,149,250 | Bing | Mar. 7, 1939 |
| 2,573,729 | Rath | Nov. 6, 1951 |
| 2,666,858 | Levine | Jan. 19, 1954 |
| 2,749,799 | Strem | June 12, 1956 |
| 2,795,168 | Bauer | June 11, 1957 |
| 2,815,454 | Gilbert | Dec. 3, 1957 |
| 2,857,555 | Koen et al. | Oct. 21, 1958 |

FOREIGN PATENTS

| | | |
|---|---|---|
| 885,047 | Germany | July 30, 1953 |